United States Patent Office 3,247,212
Patented Apr. 19, 1966

3,247,212
THIO SUBSTITUTED 3 AMINO ISOQUINOLINES
Francis Johnson, Newton Lower Falls, Mass., assignor to The Dow Chemical Company, Midland, Mich., a corporation of Delaware
No Drawing. Filed Mar. 19, 1963, Ser. No. 266,194
17 Claims. (Cl. 260—287)

The present invention is directed to processes for preparing novel substituted isoquinolines.

It is an object of the present invention to provide novel 1-thiohydrocarbon-3-aminoisoquinolines. It is also an object of this invention to provide processes for preparing said novel compounds.

I discovered that the acid salts of 1-thiohydrocarbon-3-aminoisoquinolines are prepared when a 2-cyanobenzyl cyanide is reacted with a mercaptan (R'SH) in the presence of a strong mineral acid (HX) as illustrated below:

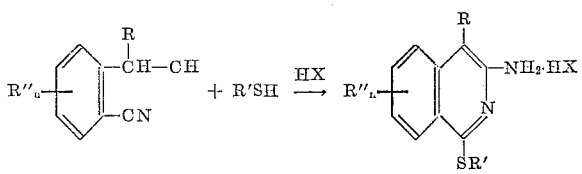

The isolation of these salts is accomplished by removal of the reaction solvent. The free base is prepared by neutralization of the salt. The free bases have a low melting point. In many cases the more easily handled higher melting acyl derivatives of the novel isoquinolines are desired. These are prepared by using a caroxylic acid acylating agent as the solvent for the cyclization reaction, and allowing acylation to occur during standing (usually several days) following the preparation of the salt. Alternatively, the acylating agent, e.g. acetic anhydride, may be added to the reaction mixture subsequent to the preparation of the salt. The novel acylated compounds, 1-thiohydrocarbon-3-acylaminoisoquinolines have the following structure:

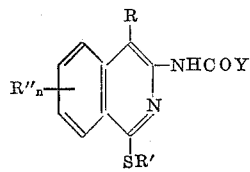

wherein —COY is the residue of the acylating agent.

The 2-cyanobenzyl cyanide reactant may be substituted by any group which is stable under the reaction conditions. The noted R groups may be hydrogen, a lower alkyl such as methyl, ethyl, octyl, benzyl, ethylphenyl, 4-ethoxybutyl, etc., or a monocyclic aryl such as phenyl, chlorophenyl, dimethylphenyl, etc. The phenyl ring of the 2-cyanobenzyl moiety may contain one or two substitutents (R'') such as chloro, fluoro, nitro, acyl, lower alkyl, carboxy, alkoxy, etc. $n$ is one or two.

The mercaptan reactant may contain any group which is stable in the presence of strong mineral acids. R' may be a lower alkyl, such as methyl, ethyl, butyl, octyl, phenylethyl, phenylmethyl, etc., a monocyclic alkyl such as cyclopentyl and cyclohexyl, or a monocyclic aryl such as phenyl, chlorophenyl, dimethylphenyl, nitrophenyl, etc.

The basic reaction between the 2-cyanobenzyl cyanide and the mercaptan involves a cyclization which takes place in the presence of strong mineral acids, and particularly those acids which readily form salts with amines, such as the hydrohalides, sulfuric acid, and phosphoric acid. The hydrohalides and particularly hydrogen chloride and hydrogen bromide are preferred.

A reaction solvent inert to the reactants may be utilized. These include such solvents as acetic acid, propionic acid, anhydrous ethyl and/or butyl ethers, ethylene dichloride, chloroform, dioxane, carbon tetrachloride, nitromethane, benzene, methylene chloride, etc. The preferred solvents are acetic acid, ethers, methylene chloride and benzene.

When the reaction mixture contains, usually as a solvent, an acylating reagent, the product is acylated at the amine substituent at the No. 3 position. Extended reaction times tend to lead to the acylated product. This may be desirable because of the ease of isolation of the acylated material. The preferred acylating reagents are the lower alkyl carboxylic acids, e.g., acetic acid, propionic acid, etc. Deacylation may be accomplished by treatment with aqueous mineral acid or base.

The cyclization reaction occurs over a wide range of temperatures, from about −50° C. to about 200° C. The upper limit is the decomposition temperature of the reactants and/or solvents and/or other components of the reaction mixture. The reaction goes to completion more rapidly at higher temperatures. As much as twelve hours may be required at room temperature for the reaction to go. The preferred reaction temperature is between room temperature and 120° C.

The reactants may be present in the reaction mixture in the stoichiometric proportion, i.e., a 1:1 molar ratio. It is preferred that the mercaptan be present in excess. Twice the stoichiometric amount is preferred to obtain best yields. The amount of the preferred hydrogen halide or other acid may vary. For best results, one equivalent of the acid is preferred, especially in the reactions conducted at room temperatures. Smaller amounts give good yields at higher temperatures. The yields obtained experimentally vary between 40% to as much as 100%.

The isoquinolines are obtained from the reaction mixture by conventional separating techniques. A preferred method includes neutralizing the acid solution, separating the organic layer, and crystallizing the isoquinoline from a preferred solvent such as methylene chloride.

For the purpose of further explaining the invention to those skilled in the art, the following illustrative examples are given:

Example 1.—1-thiophenyl-3-acetaminoisoquinoline

To 2-cyanobenzyl cyanide (1.5 g.) in acetic acid was added benzenethiol (2.2 g.) in a solution of hydrogen bromide; in acetic acid (30–33% HBr; 8 ml.). The mixture was allowed to stand for two days and then added to an excess of sodium hydroxide solution (8 N; 100 ml.) and methylene chloride. The organic layer was separated, washed with water, dried (MgSO₄) and evaporated to dryness. The residual oil crystallized easily from methylene chloride-ether as small colorless plates M.P. 152–4° (2.5 g.). The analytical sample was prepared by crystallization from the same solvent M.P. 155–157° C.

Found: C, 69.6; H, 4.8; N. 9.4; S, 10.6%.
Req'd for C₁₇H₁₄OSN₂: C, 69.4; H, 4.8; N, 9.5; S. 10.9.

All temperatures noted are in ° C. Desulfurization of this material with Raney nickel led to the known 3-acetaminoisoquinoline M.P. 125°.

Example 2.—1-thio(4-chlorophenyl)-3-acetaminoisoquinoline

Using the procedure of Example 1, 4-chlorobenzenethiol (3 g.) and 2-cyanobenzyl cyanide (1.5 g.) led to 1 - thio(4 - chlorophenyl)-3-acetaminoisoquinoline M.P. 141–2° C. (2.6 g.).

Found: C, 61.9; H, 3.9; N, 8.3; S, 9.8.
Req'd for: C₁₇H₁₃N₂OSCl: C, 62.1; H, 4.0; N, 8.5; S, 9.8.

Example 3.—1-thio(4-methylphenyl)-3-acetaminoisoquinoline

Using the procedure of Example 1, 2-cyanobenzyl cyanide (1.5 g.) and 4-tolylthiol (2.5 g.) when treated for 3 days at room temperature with hydrogen bromide in acetic acid led to 1-thio(4-methylphenyl)-3-acetaminoisoquinoline (2.9 g.) M.P. 168–9° C.

Found: C, 70.0; H, 5.2; N, 9.2; S, 10.5.
Req'd for: $C_{18}H_{16}OS$: C, 70.10; H, 5.2; N, 9.1; S, 10.4.

Example 4.—1-thiobenzyl-3-aminoisoquinoline

Using the same procedure of Example 1, 2-cyanobenzyl cyanide (3.0 g.) and benzylthiol (5.0 g.) when treated with hydrogen bromide in acetic acid led after ½ hr. at room temperature to the hydrogen bromide salt of 1-thiobenzyl-3-aminoisoquinoline (4.6 g.) which on neutralization yielded the free amine M.P. 55–56° C.

Found: C, 72.0; H, 5.3; N, 10.4; S, 12.3.
Req'd for $C_{16}H_{14}N_2S$: C, 72.1; H, 5.3; N, 10.5; S, 12.0%.

Example 5.—1-thiocyclohexyl-3-aminoisoquinoline

Cyclohexyl mercaptan (4.7 g.) and 2-cyanobenzyl cyanide (3.0 g.) in 25 ml. of acetic acid were treated with 16 ml. of hydrogen bromide in acetic acid (33% HBr). After heating for 1 hour at reflux temperature 1-thiocyclohexyl-3-aminoisoquinoline (4.4 g.) was obtained (M.P. 91.5–93° C.) by base neutralization of the crystalline hydrobromide obtained from the reaction.

Found: C, 69.9; H, 6.9; N, 10.7; S, 12.6.
Req'd for $C_{15}H_{18}N_2S$: C, 69.7; H, 7.0; N, 10.8; S, 12.4%.

Example 6.—1-thioacetic acid-3-aminoisoquinoline hydrobromide, ethyl ester 2-cyanobenzyl cyanide (1.5 g.) in acetic acid (20 ml.) containing thioacetic acid (1.8 g.) was treated with 33% hydrogen bromide in acetic acid (10 ml.). After four days the reaction products were filtered off and refluxed in ethanol. Crystallization gave 1.85 g. of 1-(thioacetic acid)-3-aminoisoquinoline hydrobromide, ethyl ester, M.P. 209.5–211.5° C.

Found: C, 45.20; H, 4.27; Br, 23.30; N, 8.0; S, 9.44.
Req'd for $C_{13}H_{15}BrN_2O_2S$: C, 45.49; H, 4.40; Br, 23.28; N, 8.16; S, 9.34%.

Example 7.—1-thiophenyl-3-aminoisoquinoline

The 1-thiophenyl-3-acetaminoisoquinoline of Example 1 was heated with aqueous hydrochloric acid and the solution concentrated to dryness. Neutralization of the residue by base followed by crystallization of the solid gave 1-thiophenyl-3-aminoisoquinoline.

Similar products are obtained using hydrogen chloride, hydrogen iodide, as the acid, and ether, benzene, or methylene chloride as the solvent in place of acetic acid followed by heating product with acetic anhydride. The mercaptans listed on Table I may each be reacted with 2-cyanobenzylcyanide from Table II, in accordance with the procedure of the previous examples, to prepare 1-thiohydrocarbon-3-aminoisoquinolines, their acid salts, or 1-thiohydrocarbon-3-acylamineisoquinolines, depending on the explicit conditions used.

TABLE I

Octyl mercaptan
Ethyl mercaptan
2-ethylhexyl mercaptan
Chlorohexyl mercaptan
Methyl mercaptan
Tolyl mercaptan
p-Methoxyphenyl mercaptan
p-Phenoxyphenyl mercaptan
p-Nitrophenyl mercaptan

TABLE II 2-cyanobenzyl cyanide
α-Benzyl-2-cyanobenzyl cyanide
α-(2-phenylethyl)-cyanobenzyl cyanide
α-(p-tolyl)-2-cyanobenzyl cyanide
2-cyano-4-nitrobenzyl cyanide
2-cyano-chlorobenzyl cyanide
2-cyano-4-phenoxybenzyl cyanide
2-cyano-3,5-dimethylbenzyl cyanide
2-cyano-4-carboxymethylbenzyl cyanide The 1-thiohydrocarbon-3-aminoisoquinolines, their acid salts, and acylated 1-thiohydrocarbon-3-aminoisoquinolines are useful as inhibiters of crabgrass. Some have activity against housefly and cockroach. Others are specific poisons for carp.

As many embodiments of this invention may be made without departing from the spirit and scope thereof, it is to be understood that the invention includes all such modifications and variations as come within the scope of the appended claims.

Reference is made to my patent application Serial No. 266,196, directed to the 2-amino-6-thiohydrocarbonpyridines, filed of even date herewith, which is made a part hereof.

What is claimed is:

1. A 1-thiohydrocarbon-3-acylaminoisoquinoline having the formula

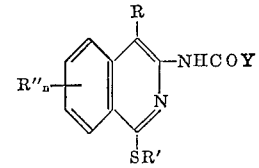

wherein:
R is selected from the group consisting of hydrogen, lower alkyls, and monocyclicaryls;
R' is selected from the group consisting of lower alkyls, cyclopentyl, cyclohexyl, and monocyclicaryls;
R" is selected from the group consisting of hydrogen, halide, nitro, lower alkyl, carboxy and lower alkoxy;
Y is a lower alkyl group; and
n is a whole number from 1 to 2.

2. A 1-thiohydrocarbon-3-aminoisoquinoline having the formula

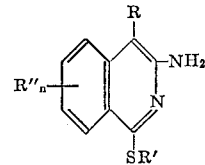

wherein:
R is selected from the group consisting of hydrogen, lower alkyls, and monocyclicaryls;
R' is selected from the group consisting of lower alkyls, cyclopentyl, cyclohexyl, and monocyclicaryls;
R" is selected from the group consisting of hydrogen halide, nitro, lower alkyl, carboxy and lower alkoxy; and
n is a whole number from 1 to 2, and the acid salts thereof.

3. A 1 - thiohydrocarbon-3-aminoisoquinoline having the formula

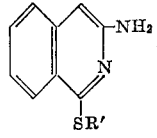

wherein R' is selected from the group consisting of lower alkyls, cyclopentyl, cyclohexyl, and monocyclicaryls.

4. 1-thiophenyl-3-aminoisoquinoline.
5. 1-thiophenyl-3-acetaminoisoquinoline.
6. 1-thio(4-chlorophenyl)-3-acetaminoisoquinoline.

7. 1-thio(4-methylphenyl)-3-acetaminoisoquinoline.

8. 1-thiobenzyl-3-aminoisoquinoline.

9. The hydrogen bromide salt of 1-thiobenzyl-3-aminoisoquinoline.

10. 1-thiocyclohexyl-3-aminoisoquinoline.

11. The hydrogen bromide salt of 1-thiocyclohexyl-3-aminoisoquinoline.

12. 1 - (thioacetic acid) - 3 - aminoisoquinoline hydrobromide, ethyl ester.

13. The process for preparing the acid salts of 1-thiohydrocarbon-3-aminoisoquinolines comprising reacting a 2-cyanobenzyl cyanide with a mercaptan having the formula RSH, wherein R is selected from the group consisting of loweralkyls, cyclopentyl, cyclohexyl, and monocyclicaryls, in the presence of an acid selected from the group consisting of the hydrohalides, sulfuric acid, and phosphoric acid, at a temperature between —50° C. and 200° C.

14. The process for preparing the acid salts of 1-thiohydrocarbon-3-aminoisoquinolines comprising reacting a 2-cyanobenzyl cyanide with a mercaptan having the formula RSH, wherein R is selected from the group consisting of loweralkyls, cyclopentyl, cyclohexyl, and mono cyclicaryls, the mercaptan being present in excess of a 1:1 molar ratio with the cyanide, in the presence of a hydrohalide, at a temperature between room temperature and 120° C.

15. The process for preparing 1-thiohydrocarbon-3-acylaminoisoquinolines comprising reacting a 2-cyanobenzyl cyanide with a mercaptain having the formula RSH, wherein R is selected from the group consisting of loweralkyls, monocyclicalkyls, and monocyclicaryls, in the presence of a hydrohalide, in a lower carboxylic acid solvent, at a temperature between room temperature and 120° C. and then, after at least one day, separating the said acylated isoquinoline from the reaction mixture.

16. The process of claim 15 wherein the solvent is selected from the group consisting of acetic acid and propionic acid.

17. The process of claim 14 wherein the reaction is carried out in a solvent selected from the group consisting of acetic acid, ethers, methylene chloride, and benzene.

References Cited by the Examiner

Fieser and Fieser: "Advanced Organic Chemistry," Reinhold, 1961, p. 312 relied upon.

Wheland: Advanced Organic Chemistry, 2d ed., p. 373 (1949).

NICHOLAS S. RIZZO, *Primary Examiner.*